(12) United States Patent
Ganti et al.

(10) Patent No.: US 11,182,611 B2
(45) Date of Patent: Nov. 23, 2021

(54) FIRE DETECTION VIA REMOTE SENSING AND MOBILE SENSORS

(71) Applicant: International Business Machines Corporation, Armonk, NY (US)

(72) Inventors: Raghu Kiran Ganti, Elmsford, NY (US); Dinesh C. Verma, New Castle, NY (US); Mudhakar Srivatsa, White Plains, NY (US); Pranita Sharad Dewan, White Plains, NY (US); Linsong Chu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 16/600,408

(22) Filed: Oct. 11, 2019

(65) Prior Publication Data

US 2021/0110136 A1    Apr. 15, 2021

(51) Int. Cl.
*G06K 9/00* (2006.01)
*G06N 3/08* (2006.01)
(Continued)

(52) U.S. Cl.
CPC .......... *G06K 9/0063* (2013.01); *B64C 39/024* (2013.01); *B64D 47/08* (2013.01); *G01C 23/00* (2013.01); *G01S 19/45* (2013.01); *G06K 9/629* (2013.01); *G06K 9/6262* (2013.01); *G06N 3/0454* (2013.01); *G06N 3/08* (2013.01);
(Continued)

(58) Field of Classification Search
CPC .... G06Q 10/06; G08B 17/005; G08B 17/125; Y10S 706/90; Y10S 706/913; G01C 23/00; G01S 19/45; G06K 9/0063; G06K 9/00657; G06K 9/4628; G06K 9/6262; G06K 9/6271; G06K 9/629; G06N 3/006; G06N 3/0454; G06N 3/08; G06N 3/088; G06T 2207/10032; G06T 2207/20021; G06T 2207/20081; G06T 2207/20084;
(Continued)

(56) References Cited

U.S. PATENT DOCUMENTS 5,832,187 A * 11/1998 Pedersen ............. G08B 17/005
                                                706/45
6,281,970 B1    8/2001 Williams et al.
(Continued)

FOREIGN PATENT DOCUMENTS

| CN | 105719421 A | 6/2016 |
| CN | 106595671 A | 4/2017 |
| WO | 2016132161 A1 | 8/2016 |

OTHER PUBLICATIONS

Calo et al., "Edge computing architecture for applying AI to IoT," 2017 IEEE International Conference on Big Data (Big Data), Boston, MA, 2017, pp. 3012-3016.
(Continued)

*Primary Examiner* — Manuchehr Rahmjoo
(74) *Attorney, Agent, or Firm* — Joseph Petrokaitis; Otterstedt, Wallace & Kammer, LLP (57) ABSTRACT

Methods and systems for detecting events. A satellite image is obtained and the satellite image is processed using a first convolutional neural network (CNN) to produce a satellite vector that identifies at least one fire. A mobile sensor is automatically directed to a mobile location based on the satellite vector.

18 Claims, 7 Drawing Sheets

(51) Int. Cl.

| | |
|---|---|
| *G06K 9/62* | (2006.01) |
| *G06T 7/70* | (2017.01) |
| *B64C 39/02* | (2006.01) |
| *B64D 47/08* | (2006.01) |
| *G01C 23/00* | (2006.01) |
| *G01S 19/45* | (2010.01) |
| *G06N 3/04* | (2006.01) |

(52) U.S. Cl.
CPC .......... *G06T 7/70* (2017.01); *B64C 2201/123* (2013.01); *B64C 2201/127* (2013.01); *B64C 2201/145* (2013.01); *G06T 2207/10032* (2013.01); *G06T 2207/20081* (2013.01); *G06T 2207/20084* (2013.01); *G06T 2207/30184* (2013.01)

(58) Field of Classification Search
CPC . G06T 2207/30184; G06T 2207/30188; G06T 7/70; G06T 7/73
See application file for complete search history.

(56) References Cited

U.S. PATENT DOCUMENTS

| | | | |
|---|---|---|---|
| 7,343,222 | B2 | 3/2008 | Solomon |
| 2018/0129974 | A1 | 5/2018 | Giering et al. |

OTHER PUBLICATIONS

Haksar, "Distributed Deep Reinforcement Learning for Fighting Forest Fires with a Network of Aerial Robots," 2018 IEEE/RSJ International Conference on Intelligent Robots and Systems (IROS), Madrid, Spain, 2018, pp. 1067-1074.

Julian, "Distributed Wildfire Surveillance with Autonomous Aircraft using Deep Reinforcement Learning." (Submitted on Oct. 9, 2018) https://arxiv.org/abs/1810.04244.

Pham, "A distributed control framework for a team of unmanned aerial vehicles for dynamic wildfire tracking," 2017 IEEE/RSJ International Conference on Intelligent Robots and Systems (IROS), Vancouver, BC, 2017, pp. 6648-6653.

Zuluaga, "Deep Reinforcement Learning for Autonomous Search and Rescue," NAECON 2018—IEEE National Aerospace and Electronics Conference, Dayton, OH, 2018, pp. 521-524.

Pham, "Autonomous UAV Navigation Using Reinforcement Learning." (Submitted on Jan. 16, 2018) https://arxiv.org/abs/1801.05086.

Ghesu, "Multi-Scale Deep Reinforcement Learning for Real-Time 3D-Landmark Detection in CT Scans" IEEE Transactions on Pattern Analysis and Machine Intelligence, 41.1, 2019, p. 176-189.

Giglio, "The collection 6 MODIS active fire detection algorithm and fire products", Remote Sensing of Environment 178 (2016) 31-4 https://cdn.earthdata.nasa.gov/conduit/upload/4468/Giglio2016_C6_Fire.pdf.

FIRMS—Fire Information for Resource Management System web page downloaded Mar. 20, 2019, https://firms.modaps.eosdis.nasa.gov/active_fire/#firms-txt, 3 pages.

Giglio et al. The collection 6 MODIS active fire detection algorithm and fire products, Remote Sensing of Environment 178 (2016): 31-41 https://cdn.earthdata.nasa.gov/conduit/upload/4468/Giglio2016_C6_Fire.pdf.

\* cited by examiner

FIRE DETECTION VIA REMOTE SENSING AND MOBILE SENSORS

BACKGROUND

The present invention relates to the electrical, electronic and computer arts, and more specifically, to technology for fire detection.

The number and severity of wildfires have increased in recent years, with four times as many wildfires happening in the 2010s compared to the 1970s in the U.S. alone. Climate change and global warming are suspected of increasing the number, duration, and intensity of wildfires. An early warning system can help control the spread of wildfires and improve the prevention of damage to life and property. Current early warning systems are based on satellite imagery and local residents spotting the birth and spreading of fire. Satellite imagery based systems, however, are prone to high false positives and are typically not relied upon as the sole source for detecting wildfires. Other systems use sensors or videos on the ground, which are far better in terms of false positive rates, but have the issue of covering only parts of the land that are susceptible to wildfires and can be expensive to install and operate.

SUMMARY

Principles of the invention provide techniques for fire detection via remote sensing and mobile sensors. In one aspect, an exemplary method includes the operations of obtaining a satellite image; processing the satellite image using a first convolutional neural network (CNN) to produce a satellite vector that identifies at least one fire; and automatically directing a mobile sensor to a location based on the satellite vector.

In one aspect, a non-transitory computer readable medium comprising computer executable instructions which when executed by a computer cause the computer to perform operations comprising obtaining a satellite image; processing the satellite image using a first convolutional neural network to produce a satellite vector that identifies at least one fire; and automatically directing a mobile sensor to a mobile location based on the satellite vector.

In one aspect, an apparatus comprises a memory; and at least one processor, coupled to said memory, and operative to perform operations comprising obtaining a satellite image; processing the satellite image using a first convolutional neural network to produce a satellite vector that identifies at least one fire; and automatically directing a mobile sensor to a mobile location based on the satellite vector.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

cost effective, rapid detection and monitoring of events, such as wildfires;

integration of different sensing modalities, such as satellites and mobile sensors;

satellite imagery processing for providing guidance in controlling the flight paths for aerial drones to maximize event discovery and geographic coverage (such as discovery of a wildfire event); and a reinforcement learning (RL) approach for navigating surveillance aerial vehicles (drones); and a multi-scale convolutional neural network (CNN) that extracts feature maps from satellite imagery and approximates the Q-table in the reinforcement learning system.

These and other features and advantages of the present invention will become apparent from the following detailed description of illustrative embodiments thereof, which is to be read in connection with the accompanying drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
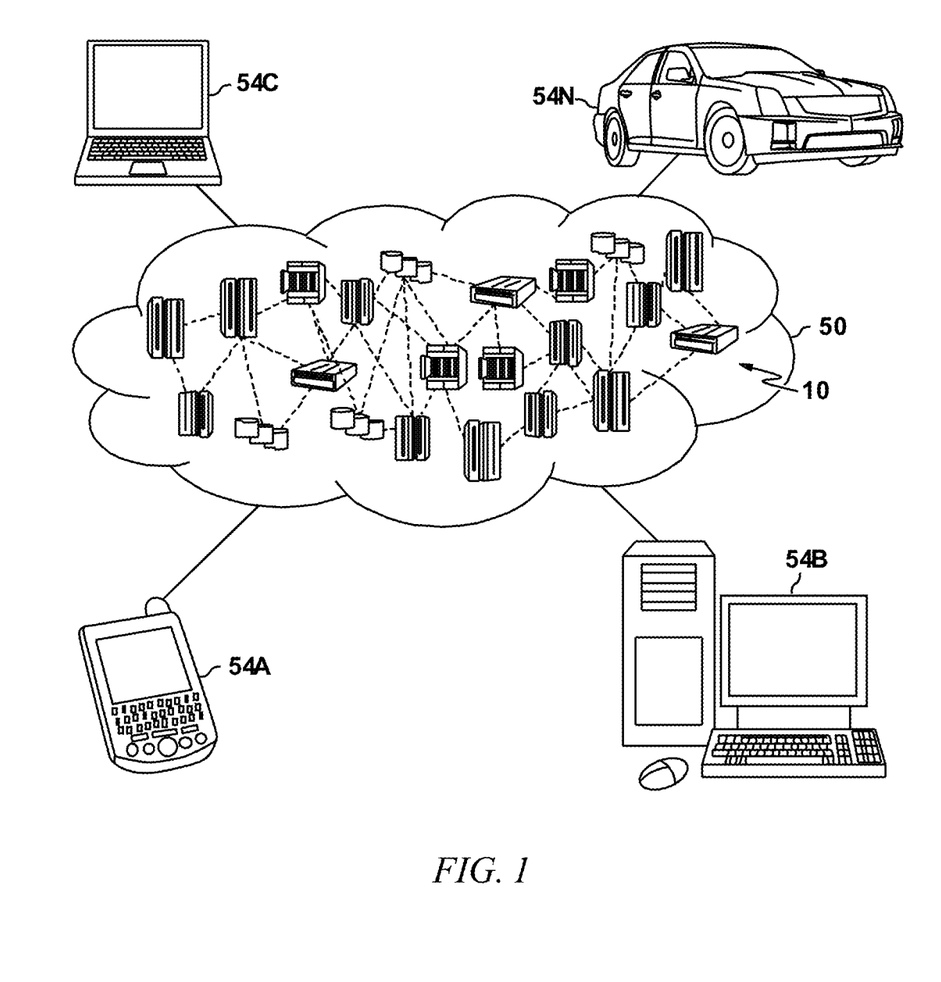
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
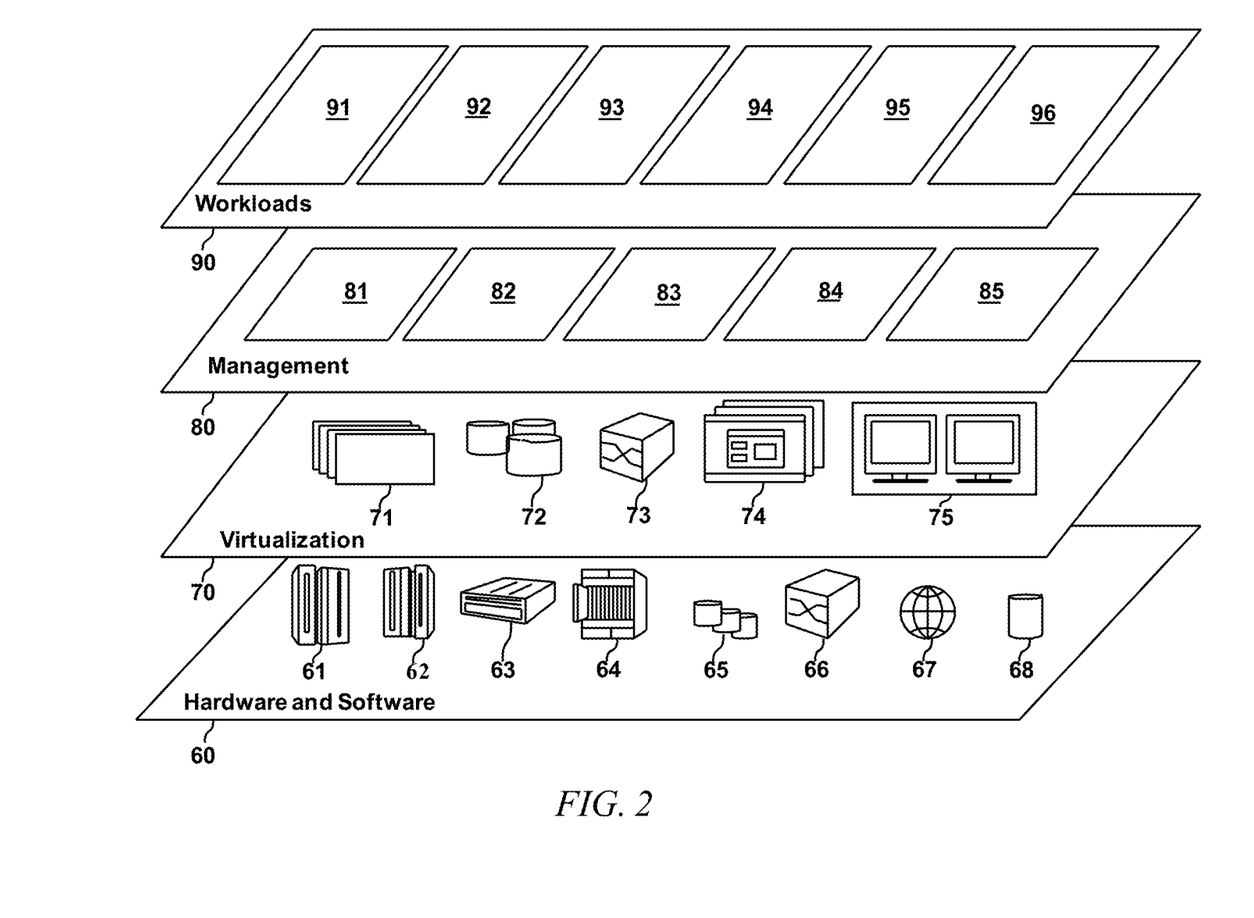
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fire detection system 96.

Heretofore, two primary sensing modalities have been used for wildfire detection: satellite-based remote sensing offers wide-spread but coarse-grained coverage; while drone-based sensing offers fine-grained but localized coverage. One or more embodiments advantageously provide techniques for combining the two approaches with satellite imagery used as hints to control flight paths for a drone to maximize discovery and coverage (e.g., for a wildfire event). One or more embodiments employ a multi-scale CNN (Convolutional Neural Network) to extract feature maps from satellite imagery and approximate the Q-table in a reinforcement learning system.

Figure 3A:
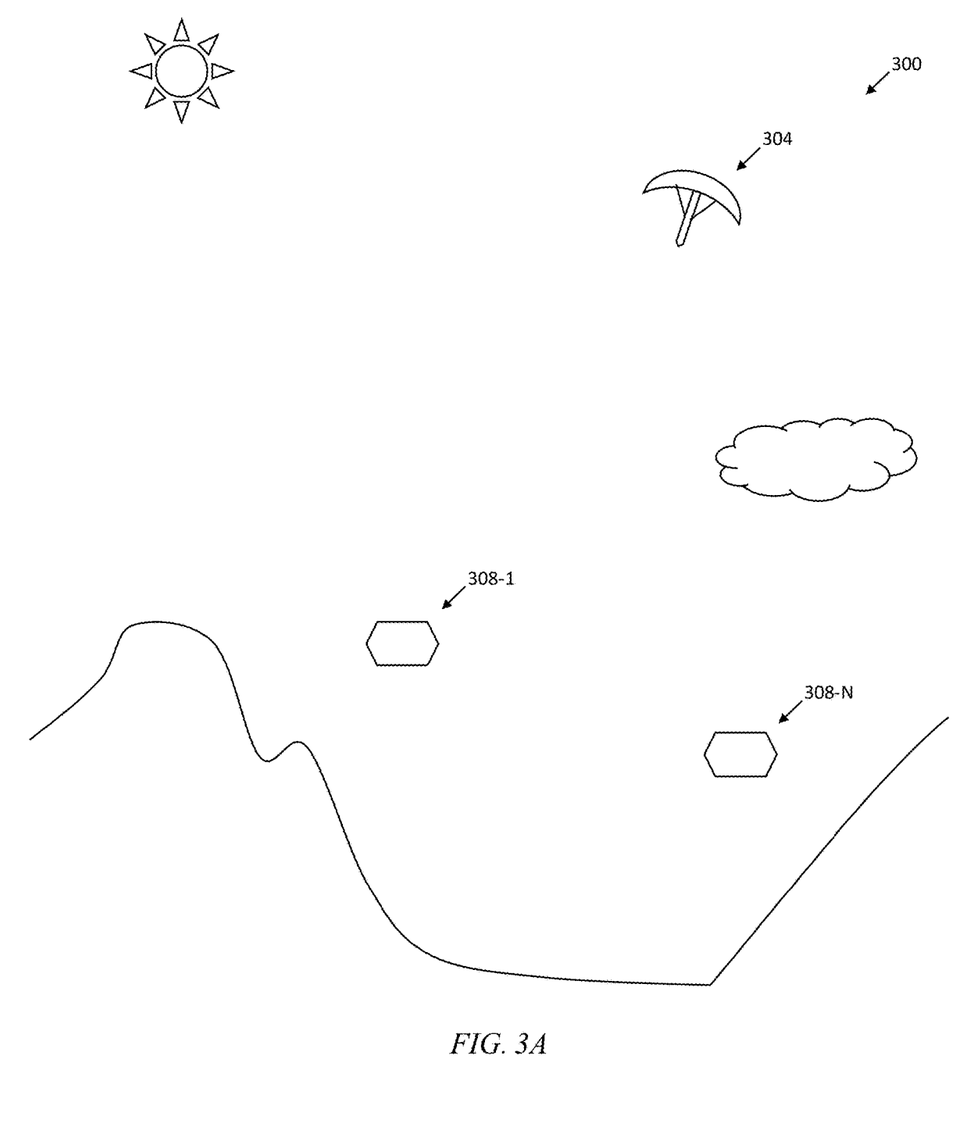
FIG. 3A illustrates a remote satellite and a number of aerial drones acquiring images of a land area including mountains and plain areas, in accordance with an example embodiment.

One or more embodiments accordingly provide methods and/or systems for integrating remote satellite image-based sensing with mobile sensor networks, where the mobile sensor is any type of mobile sensor that is controllable (such as an aerial drone). FIG. 3A illustrates a system 300 including a remote satellite 304 and a number of aerial drones 308-1 . . . 308-N (referred to collectively as aerial drones 308 herein) acquiring images of a land area (not separately numbered) including mountains and plain areas, in accordance with an example embodiment. In general, while capable of covering large regions, satellite imagery provides a coarse grained coverage of regions and is not on-demand. Moreover, while drones may provide quick, on-demand, fine grained aerial coverage, they are usually very expensive when used to cover large regions. In one example embodiment, model drone-based exploration is used as part of a reinforcement learning system where satellite imagery provides the initial "hints" for exploration by the drone(s). The reinforcement learning is then used to guide the flight paths of an aerial drone(s) (such as, move a distance of d meters along azimuth az) and to control the configuration of satellites (such as field of vision via aperture control, spectrum selection, and the like). The various actions are guided by a reward function that captures the effectiveness of discovering and mapping the wildfire event. In one example embodiment, both the satellite and the drones are controlled. In essence, the satellite imagery is used to control and guide the drone flight path; and the drone imagery is used to control the configuration of the satellite(s) to maximize the effectiveness of the wildfire detection.

The remote satellite image-based sensing identifies regions of potential interest (in terms of wildfires) and the mobile sensors are deployed to the area of interest to ascertain the validity of the observations. In one example embodiment, satellite imagery from infra-red satellites provides heat maps of the ground area. Conventional techniques, such as intensity-based thresholds, often result in a higher number of false alarms. These are caused by smoke obscured fires, desert regions, tree cover, and the like. The disclosed satellite imagery based technique can be used to identify potential regions of fire. While the present system is described in terms of detecting wildfires using aerial drones, other events may be detected, such as urban fires, animal migrations, storm progression, and the like. In addition, other mobile sensors may be utilized, such as smartphones, Internet cameras, and the like.

In one example embodiment, a deep learning pipeline is used where each pixel captures the intensity of fire, if any, in the corresponding region. The potential wildfire region(s) is/are marked and a mobile sensor network is deployed for further verification. A mobile sensor network can include, for example, a drone-based cooperative network, low flying manned aerial vehicles, and the like. In one example embodiment, humans collect imagery using cellphones or other devices near the affected regions. The mobile sensors use various technologies, such as on-ground imagery, video, smoke sensors, and the like, and tend to have a higher fidelity of sensing wildfires than satellite imagery. For example, drone-based sensors generally capture higher resolution images than satellites. Cellphone camera images can also provide augmented information. A manual verification step can be employed to further reduce false positives results.

In one example embodiment, the integration of the mobile sensor network can be extended to optimize the mobile sensor network and/or mobile crowd sourced network. The optimization criteria can be the location of the possible wildfire (based on the remote satellite imagery), the proximity of manmade structures and residential locations, the potential to cause damage, the intensity levels, and the like.

In one example embodiment, a reinforcement learning approach combines satellite imagery with drone imagery. Reinforcement learning (RL) systems learn actions that are needed to reach a defined goal based on a reward system. As learning progresses, the RL system learns a sequence of actions that increase the awards received while achieving the defined goal; the actions are evaluated based on the results (rewards) that are achieved. In essence, the RL system generates a reward for a "good" decision and a penalty for a "bad" decision, that is, a decision that does not lead towards achieving the defined goal. In one example embodiment, the RL system is capable of evaluating actions that, while being more immediate, may not be awarded a reward until sometime in the future.

In one example embodiment, the RL algorithm operates in terms of environments, state space, action space, and rewards. The space state is the current situation encountered by the RL algorithm, such as the visual observations encountered by the present system and the location of an aerial drone. In addition, the RL algorithm is limited to performing only certain actions within a defined action space (e.g. a set of allowable actions, such as feasible movements of an aerial drone). The action(s) to be performed are selected, using a defined policy, based on the current space state of the RL algorithm and input from the environment. In response to an action and the current state of the RL algorithm, the environment generates a reward and determines the next state of the RL algorithm. In one or more embodiments, the reward is an indication of the success or failure of the sequence of selected actions in advancing toward the defined goal.

In one example embodiment, a discount factor is multiplied by a reward to generate a discounted reward. The discounted reward reduces the influence of the reward on the RL algorithm's action selection. In one example embodiment, the discount reward varies. For example, with lambda equal to 0.99, the reward at the current time step is $\text{lambda}^0$, the reward at the next time step is $\text{lambda}^1$ and, at the $n^{th}$ timestep, is $\text{lambda}^n$.

In one example embodiment, the state space may be visualized as a two-dimensional grid representing the area of interest for navigation of the UAV. The state space may be defined in terms of sensor orientation (the direction or the region of the Earth being sensed by the sensor), aperture control, field of vision control (the extent of the region being sensed; controlled via, for example, a sensing aperture), spectral control (the frequencies that are being sensed; may include hyperspectral imaging and cover frequencies ranging from far infra-red to ultra-violet), and the like. During training, the state space represents areas where there is ground truth about a previous wildfire (obtained through a ground-based and/or aerial survey of the region). Areas where no fire has occurred and/or been detected may also be used in training.

Figure 3B:
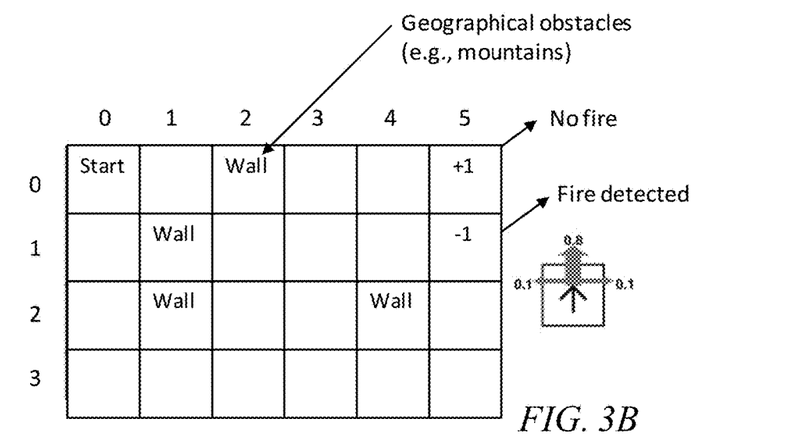
FIG. 3B is an example state space for a 40 by 60 square mile territory, in accordance with an example embodiment.

FIG. 3B is an example state space for a 40 by 60 square mile territory, in accordance with an example embodiment. Each tile represents, for example, a 10 by 10 square mile quadrant. The granularity of the grid is set up to match the granularity at which the drone operates. Quadrant 0, 0 is designated as the start of the reconnaissance. Following the assessment, a quadrant where no fire has been detected is labeled with a +1 and a quadrant where a fire is suspected or confirmed is labeled with a −1. Quadrants with obstacles, such as mountains, are labeled as "wall" indicating that, from the perspective of the drone, the territory corresponding to the tile is inaccessible.

The action space (such as the sensor azimuth, field of vision reduction/increase, aperture reduction/increase, spectral selection, and the like) defines the set of actions that can be performed by the drone for a given state. In any state (i.e., occupying any location (pixel) in the two-dimensional grid), the drone can stay in that location (pixel), or move up, down, right, or left (dependent on the location of obstacles).

The drone is "motivated" to detect (locate) a wildfire based on a reward function as part of the reinforcement learning approach. The drone is awarded a reward for each pixel visited and/or photographed by the drone that has a fire as evidenced by ground truth. Through the reinforcement learning approach, the drone learns how to navigate using both coarse-grained (full coverage imagery, such as satellite imagery) and fine-grained (partial coverage imagery, such as drone imagery, starting from zero coverage) imagery and accumulates fine-grained images in order to maximize its discounted reward.

In one example embodiment, the drone detection system utilizes a deep Q-network (DQN). Deep Q-learning is used for reinforcement learning: the output of a multi-scale CNN is used for approximating the Q-table. This is achieved by concatenating together the multi-scale outputs (the last convolutional layer) from satellite and drone multi-scale CNN models (if available). The satellite and drone model outputs cover the same area, but each pixel in the corresponding output represents a different area size. The satellite model output pixel covers a much larger area than a drone model output pixel, but there is a unique pixel in the satellite model output that covers the target pixel in the drone model output (and also in the state space since the state space grid granularity is based on the drone model output granularity). In addition, output from the drone model is optional since it is possible that the region of interest was not captured by the drone image.

During training, the input dataset includes historical images from satellites and drones, and an indication of whether a corresponding image depicts a wildfire. The satellite and drone models of the multi-scale CNN are trained individually, either sequentially or in parallel, using historical satellite and drone imagery, respectively, of fires in different stages of life.

During normal operation, the multi-scale convolutional neural network (CNN) combines the satellite and drone imagery and is used for enabling the remote satellite image-based system to provide "hints" (such as to the reinforcement learning system of the drone's navigation system). The output of the multi-scale CNN is used for approximating the Q-table of the deep Q-network. Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

Figure 4:
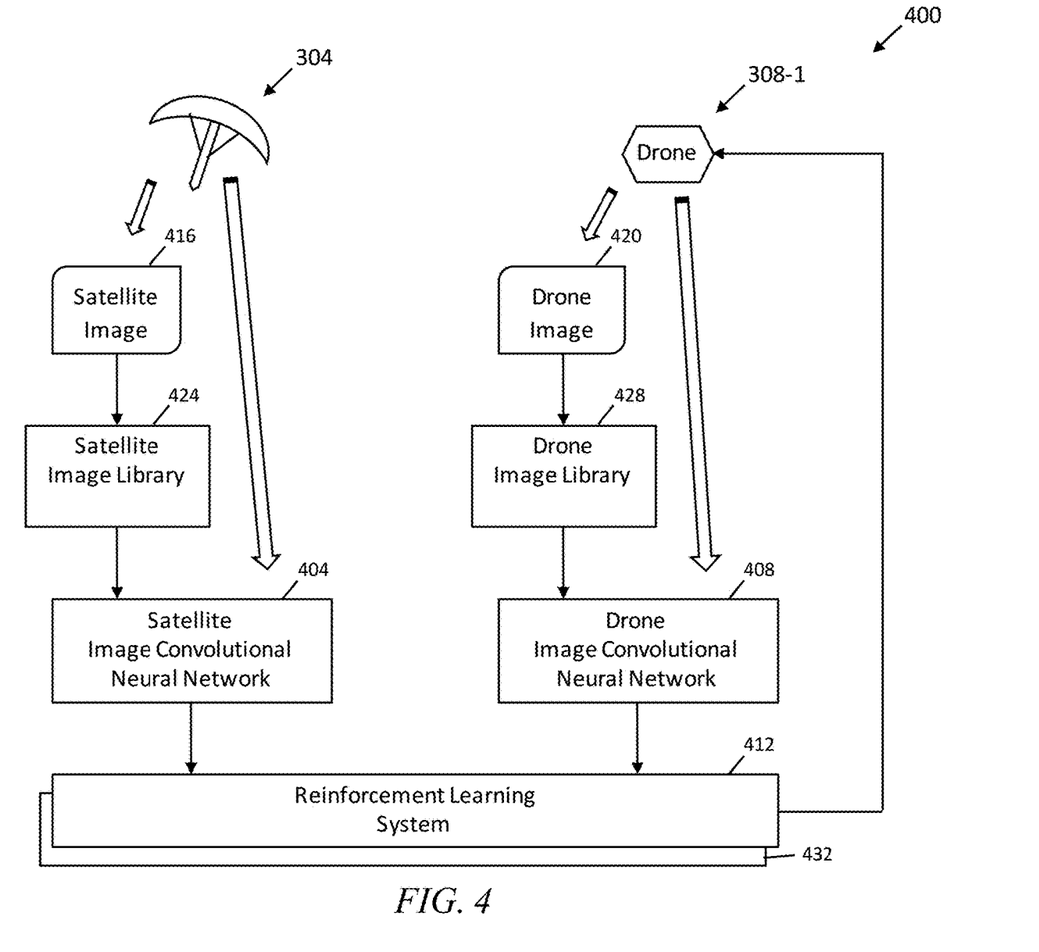
FIG. 4 is a block diagram of an example fire detection system, in accordance with an example embodiment.

FIG. 4 is a block diagram of an example fire detection system 400, in accordance with an example embodiment. In one example embodiment, during a training session, a satellite image 416 archived in a satellite image library 424 is retrieved and used to train a satellite image CNN 404, and a drone image 420 archived in a drone image library 428 is retrieved and used to train a drone image CNN 408.

In one example embodiment, during normal operation, a satellite image 416 is obtained from the satellite 304 and input into the satellite image CNN 404. (In one example embodiment, the obtained satellite image 416 is also stored in the satellite image library 424.) The satellite image CNN 404 processes the satellite image 416 and produces a satellite vector indicating the number of detected wildfires along with the location of each wildfire. The produced results are submitted to a reinforcement learning system 412. The reinforcement learning system 412 uses the satellite vector to navigate one of the aerial drones 308 (e.g., 308-1 in the example) to the site of a suspected wildfire, if one was detected. Once the aerial drone 308 has been relocated to the site of the suspected wildfire, a drone image 420 is captured and submitted from the aerial drone 308 to the drone image CNN 408. The drone image CNN 408 processes the image and produces a drone vector indicating the number of detected wildfires along with the location of each wildfire, if one was detected. The reinforcement learning system 412 also processes the drone vector in combination with the satellite vector to refine the model of the reinforcement learning system 412. In one example embodiment, the reinforcement learning system 412 may navigate the aerial drone 308 to a new location and may obtain additional drone images 420 of the wildfire.

In one example embodiment, a second reinforcement learning system 432 is implemented to control the remote satellite 304, where the state space and action space is specific to satellite control and the second reinforcement learning system 432 initially uses the drone vector for learning, and then utilizes both the drone vector and the satellite vector for learning. In the case of the remote satellite 304, as noted above, the action space (such as the sensor azimuth, field of vision reduction/increase, aperture reduction/increase, spectral selection, and the like) defines the set of actions that can be performed by the satellite for a given state. In one example embodiment, the satellite control is used for better detection through finer grained sensing despite the reduction in coverage area. In one example embodiment, there are three controls: (i) a first control determines the region to sense (given the current location of the satellite with respect to the Earth, there are a certain set of regions that can be sensed); (ii) a second control (an aperture control) determines the extent of the spatial region that is sensed (essentially, (i) captures the center latitude and longitude of the sensed region and (ii) captures the extent of the area around this latitude/longitude which is sensed), and (iii) a third control (a spectrum control) determines the range of frequencies that will be sensed.

Figure 5:
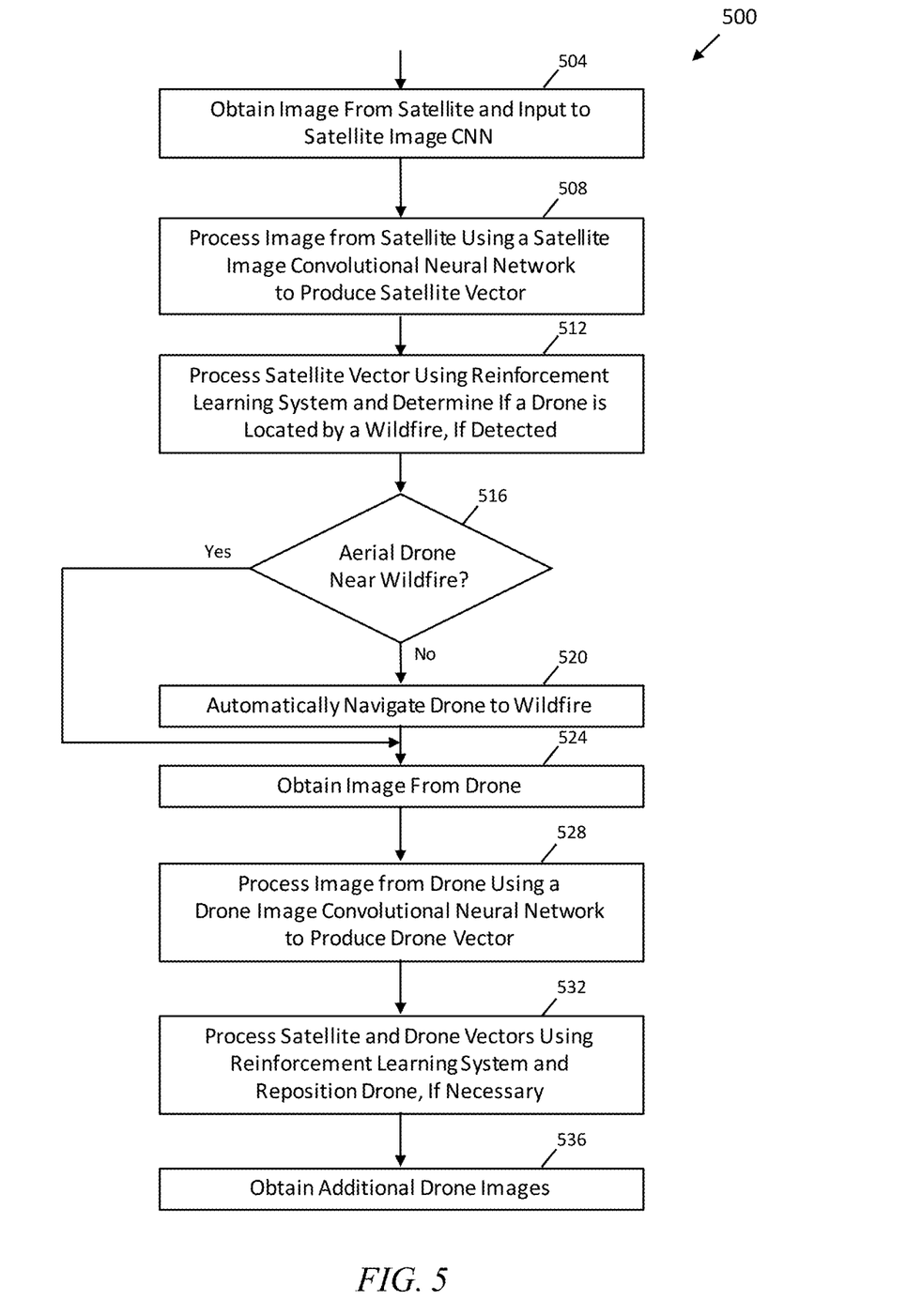
FIG. 5 is an example flowchart for detecting wildfires using mobile sensors, in accordance with an example embodiment.

FIG. 5 is an example flowchart 500 for detecting wildfires using mobile sensors, in accordance with an example embodiment. In one example embodiment, during normal operation, a satellite image 416 is obtained from the remote satellite 304 and input to the satellite image CNN 404 (operation 504). The satellite image CNN 404 has been trained to detect wildfires, as described more fully below in conjunction with FIG. 6. The satellite image CNN 404 processes the satellite image 416 and produces a satellite vector indicating the number of detected wildfires along with the location of each wildfire (operation 508). In one example embodiment, the deep learning network, for example, a convolutional auto-encoder (CAE), is trained to identify regions by backpropagating regions where fire is identified. A CAE takes as input sensor information with both satellite and drone imagery and decodes the input into a tensor where each pixel indicates a presence or absence of fire. The CAE produces values between 0 and 1 that indicate the confidence of a fire corresponding to that pixel. The satellite vector is submitted to the reinforcement learning system 412 and the reinforcement learning system 412 processes the satellite vector to determine if one of the aerial drones 308 is located at the site of a suspected wildfire, if one was detected (operation 512). In one example embodiment, the reinforcement learning system 412 is centralized and processes the sensor information from both the satellite 304 and the aerial drones 308. In one example embodiment, a tensor that has information sensed by both the satellite 304 and the aerial drones 308 is submitted to the reinforcement learning system 412. In some embodiments, the satellite 304 and the aerial drones 308 are owned by different organizations and thus have different administrators (i.e., controls on the satellites 304 and aerial drones 308 are executed by two different administrative domains).

A check is performed to determine if an aerial drone 308 was determined to be near the wildfire (decision block 516). If one or more aerial drones 308 are not located at the site of a suspected wildfire (NO branch of decision block 516), the method 500 proceeds with operation 520; otherwise (YES branch of decision block 516), either a wildfire was not detected or the drone is already located at the site of the suspected wildfire and the method 500 proceeds with operation 524.

In one example embodiment, if a wildfire is not detected in the satellite image 416, the one or more aerial drones 308 scout for a wildfire, either in their current location or in another location. For example, the aerial drone 308 may search areas randomly, may search areas that have cloud cover and/or are in the shadow of a mountain or other object (and thus are in areas where the sensing by the satellite 304 may be obscured), and the like.

During operation 520, the identification of the areas of a suspected wildfire that were determined by the satellite image CNN 404 are used by the reinforcement learning system 412 to automatically guide one or more aerial drones 308 toward the area of the suspected wildfire.

Once in position, during operation 524, the aerial drone 308 captures a drone image 420 of the area and submits the drone image 420 to the drone image CNN 408. The drone image CNN 408 processes the image and produces a drone vector indicating the number of detected wildfires along with the location of the wildfire(s), if one or more were detected (operation 528). In one example embodiment, images are also captured by the aerial drones 308 and processed as they move towards the area of the suspected wildfire. In one example embodiment, the aerial drone 308 captures a drone image 420 of the area and submits the drone image 420 to the drone image CNN 408 even in the case where the satellite 304 did not capture an image of a wildfire or a suspected wildfire.

The reinforcement learning system 412 then processes the satellite vector and the drone vector, essentially combining the satellite and drone imagery, and repositions the aerial drone 308, if necessary (operation 532). This is appropriate in one or more embodiments since satellite and drones typically have different sensing modalities (e.g. satellites capture data at a coarser granularity whereas drones capture data at a finer granularity). The reinforcement learning system 412 performs early fusion or late fusion. In early fusion, the sensed information is combined by, for example, concatenating the two tensors from the satellite and mobile sensor models pixel by pixel, that is, if either tensor indicates a fire for the corresponding pixel, the combined pixel will indicate a fire. In late fusion, feature maps extracted from the separate mobile sensor and satellite models are combined where the combined map will include the features from both models. In one or more embodiments, the fusion type is chosen based on the availability of compute resources and labelled data. If there is a large volume of labelled data and there are sufficient compute resources, an early fusion approach is selected. On the other hand, lack of either labelled data or compute resources would tilt the balance in favor of late fusion. It is presently believed that early fusion (where feasible) would most likely result in a better model (e.g., higher accuracy). In one example embodiment, during operation 532, a reward and a next state of the first reinforcement learning system is generated in response to a selected action and a current state of the first reinforcement learning system, and wherein the reward is an indication of a success or a failure of a sequence of selected actions in advancing toward a defined goal. In one example embodiment, during operation 532, a discounted reward is generated by multiplying a discount factor by a reward to reduce an influence of the reward on an action selection by the first reinforcement learning system.

In one example embodiment, the drone captures additional close-up pictures of the wildfire and navigates accordingly (operation 536).

Figure 6:
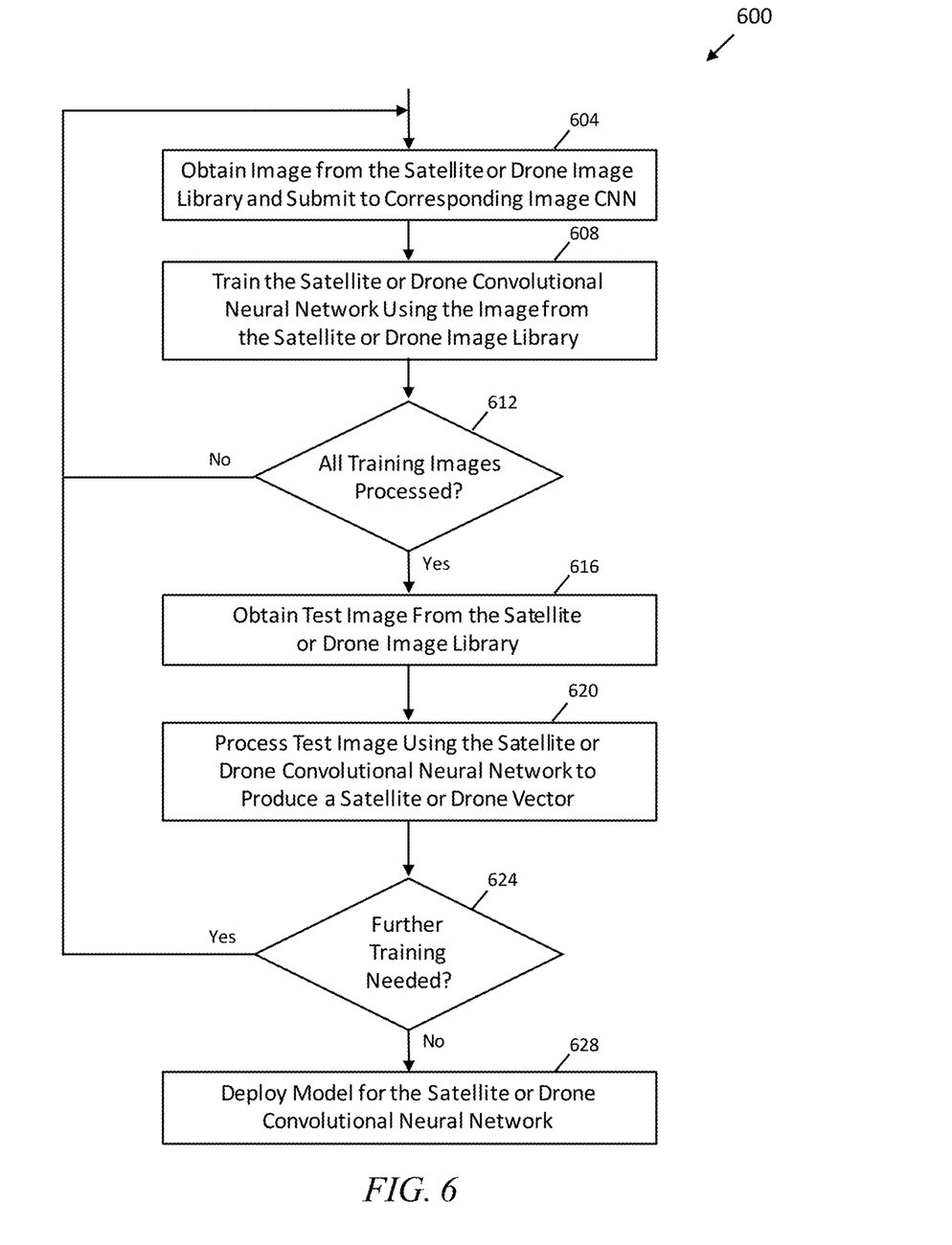
FIG. 6 is an example flowchart for training an image convolutional neural network (CNN), such as a satellite image CNN and a drone image CNN, in accordance with an example embodiment.

FIG. 6 is an example flowchart 600 for training an image CNN, such as the satellite image CNN 404 and the drone image CNN 408, in accordance with an example embodiment. In one example embodiment, each of the satellite image CNN 404 and the drone image CNN 408 are trained using between two thousand and five thousand images. In one example embodiment, a satellite image 416 or a drone image 420 is obtained from the satellite image library 424 or the drone image library 428 and submitted to the corresponding satellite image CNN 404 or drone image CNN 408 (operation 604). The satellite image CNN 404 and drone image CNN 408 includes metadata indicating the location in the image 416, 420 that depicts a wildfire, if one exists. The satellite image CNN 404 or the drone image CNN 408 then trains utilizing the corresponding image (operation 608). A check is then performed to determine if all the training images have been processed (decision block 612). If all the training images have not been processed (NO branch of decision block 612), operations 604 and 608 are repeated; otherwise (YES branch of decision block 612), the method 600 proceeds with operation 616.

Following the initial training, one or more test images are obtained from the respective satellite image library 424 or drone image library 428 (operation 616) and the respective satellite image CNN 404 or drone image CNN 408 processes each test image and generates a vector indicating the number of detected wildfires along with the location of the wildfire for each image (operation 620). Based on the results, a determination of whether the respective satellite image CNN 404 or drone image CNN 408 requires further training (retraining) is made (decision block 624). In general, the need for retraining is based on the accuracy of detection that is experienced with the test images. For example, if a false positive rate of greater than 3% or a false negative rate of greater than 1% occurs, further training is requested. If further training is required (YES branch of decision block 624), operations/blocks 604-624 are repeated; otherwise (NO branch of decision block 624), the model for the respective satellite image CNN 404 or drone image CNN 408 is deployed (operation 628).

Given the discussion thus far, it will be appreciated that, in general terms, an exemplary method, according to an aspect of the invention, includes the operations of obtaining a satellite image 416, 504; processing the satellite image 416 using a first convolutional neural network (CNN) 404 to produce a satellite vector that identifies at least one fire 508; and automatically directing a mobile sensor 308 to a location based on the satellite vector 520.

In one aspect, a non-transitory computer readable medium comprising computer executable instructions which when executed by a computer cause the computer to perform operations comprising obtaining a satellite image 416, 504; processing the satellite image 416 using a first convolutional neural network (CNN) 404 to produce a satellite vector that identifies at least one fire 508; and automatically directing a mobile sensor 308 to a mobile location based on the satellite vector 520.

In one aspect, an apparatus comprises a memory; and at least one processor, coupled to said memory, and operative to perform operations comprising obtaining a satellite image 416, 504; processing the satellite image 416 using a first convolutional neural network (CNN) 404 to produce a satellite vector that identifies at least one fire 508; and automatically directing a mobile sensor 308 to a mobile location based on the satellite vector 520.

In one example embodiment, a mobile image 420 is obtained from the mobile sensor 308; the mobile image 420 is processed using a second convolutional neural network (CNN) 408 to produce a mobile vector that identifies one or more of the at least one fire 528; and a location of the at least one fire is confirmed based on the satellite vector and the mobile vector 532. In one example embodiment, each pixel of the satellite image 416 or the mobile image 420 captures an intensity of fire in a corresponding geographic region. In one example embodiment, the mobile sensor 308 is an aerial drone 308 and further comprising configuring the aerial drone 308 based on one or more of the satellite vector and the mobile vector using a first reinforcement learning system 412, 532. In one example embodiment, an optimization criteria of the first reinforcement learning system 412 is one or more of a location of a suspected fire, a proximity of manmade structures or residential locations to a fire, a potential of the at least one fire to cause damage, and a fire intensity level. In one example embodiment, an action space is a defined set of allowable actions and a space state is a current environment encountered by the first reinforcement learning system, the space state defined in terms of one or more of sensor orientation, aperture control, field of vision control, and spectral control.

In one example embodiment, a reward and a next state of the first reinforcement learning system is generated in response to a selected action and a current state of the first reinforcement learning system 412, 532, and wherein the reward is an indication of a success or a failure of a sequence of selected actions in advancing toward a defined goal. In one example embodiment, a discounted reward is generated by multiplying a discount factor by a reward to reduce an influence of the reward on an action selection by the first reinforcement learning system 412, 532. In one example embodiment, a multi-scale output of a satellite CNN model and a multi-scale output of a mobile CNN model are combined by concatenating, pixel by pixel, a tensor from the satellite CNN model and a tensor from the mobile CNN model 532. In one example embodiment, a multi-scale output of a satellite CNN model and a multi-scale output of a mobile CNN model are combined by combining feature maps extracted from separate mobile sensor and satellite models 532.

In one example embodiment, an output of the first CNN 404 is used for approximating a Q-table of a deep Q-network. In one example embodiment, a second reinforcement learning system 432 is implemented to control a remote satellite 304, wherein a state space and an action space of the second reinforcement learning system is specific to satellite control, and the second reinforcement learning system 432 initially uses a mobile vector for learning and then utilizes both the mobile vector and the satellite vector for the learning. In one example embodiment, the satellite control comprises a first control that determines a region to sense, a second control that determines an extent of a spatial region to sense, and a third control that determines a range of frequencies to sense.

Figure 7:
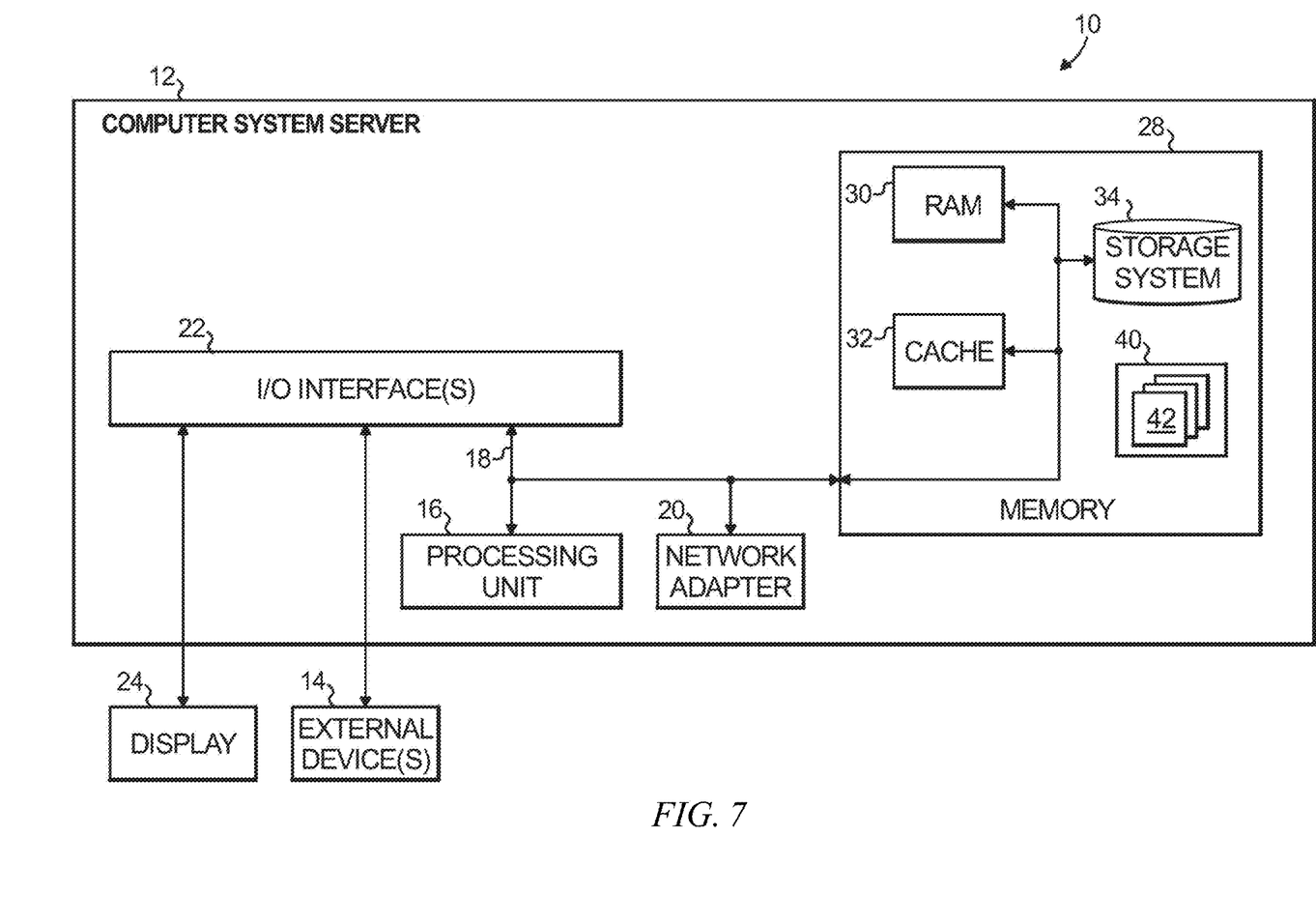
FIG. 7 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention.

Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining a coarse-grained satellite image;
processing the coarse-grained satellite image using a first convolutional neural network (CNN) to produce a satellite vector that identifies at least one fire;
automatically directing a mobile sensor to a mobile location based on the satellite vector;
obtaining a fine-grained mobile image from the mobile sensor;
processing the fine-grained mobile image using a second convolutional neural network (CNN) to produce a mobile vector that identifies the at least one fire;
confirming a location of the at least one fire based on the satellite vector and the mobile vector; and
configuring the mobile sensor to navigate based on both the satellite vector and the mobile vector using a first reinforcement learning system.

2. The method of claim 1, wherein each pixel of the satellite image or the mobile image captures an intensity of fire in a corresponding geographic region.

3. The method of claim 1, wherein the mobile sensor comprises an aerial drone.

4. The method of claim 3, wherein an optimization criteria of the first reinforcement learning system is one or more of a location of a suspected fire, a proximity of manmade structures or residential locations to a fire, a potential of the at least one fire to cause damage, and a fire intensity level.

5. The method of claim 3, wherein an action space is a defined set of allowable actions and a space state is a current environment encountered by the first reinforcement learning system, the space state defined in terms of one or more of sensor orientation, aperture control, field of vision control, and spectral control.

6. The method of claim 3, wherein a reward and a next state of the first reinforcement learning system is generated in response to a selected action and a current state of the first reinforcement learning system, and wherein the reward is an indication of a success or a failure of a sequence of selected actions in advancing toward a defined goal.

7. The method of claim 3, wherein a multi-scale output of a satellite CNN model and a multi-scale output of a mobile CNN model are combined by concatenating, pixel by pixel, a tensor from the satellite CNN model and a tensor from the mobile CNN model.

8. The method of claim 3, wherein a multi-scale output of a satellite CNN model and a multi-scale output of a mobile CNN model are combined by combining feature maps extracted from separate mobile sensor and satellite models.

9. The method of claim 3, wherein an output of the first CNN is used for approximating a Q-table of a deep Q-network.

10. The method of claim 3, wherein a second reinforcement learning system is implemented to control a remote satellite, wherein a state space and an action space of the second reinforcement learning system is specific to satellite control, and the second reinforcement learning system initially uses a mobile vector for learning and then utilizes both the mobile vector and the satellite vector for the learning.

11. The method of claim 10, wherein the satellite control comprises a first control that determines a region to sense, a second control that determines an extent of a spatial region to sense, and a third control that determines a range of frequencies to sense.

12. A method comprising:
obtaining a satellite image;
processing the satellite image using a first convolutional neural network (CNN) to produce a satellite vector that identifies at least one fire; and
automatically directing a mobile sensor to a mobile location based on the satellite vector;
obtaining a mobile image from the mobile sensor;
processing the mobile image using a second convolutional neural network (CNN) to produce a mobile vector that identifies the at least one fire,
wherein the mobile sensor is an aerial drone and further comprising configuring the aerial drone based on one or more of the satellite vector and the mobile vector using a first reinforcement learning system, and
wherein a discounted reward is generated by multiplying a discount factor by a reward to reduce an influence of the reward on an action selection by the first reinforcement learning system.

13. A non-transitory computer readable medium comprising computer executable instructions which when executed by a computer cause the computer to perform operations comprising:
obtaining a coarse-grained satellite image;
processing the coarse-grained satellite image using a first convolutional neural network (CNN) to produce a satellite vector that identifies at least one fire;
automatically directing a mobile sensor to a mobile location based on the satellite vector;
obtaining a fine-grained mobile image from the mobile sensor;
processing the fine-grained mobile image using a second convolutional neural network (CNN) to produce a mobile vector that identifies one or more of the at least one fire;
confirming a location of the at least one fire based on the satellite vector and the mobile vector; and
configuring the mobile sensor to navigate based on both the satellite vector and the mobile vector using a first reinforcement learning system.

14. An apparatus comprising:
a memory; and
at least one processor, coupled to said memory, and operative to perform operations comprising:
obtaining a coarse-grained satellite image;
processing the coarse-grained satellite image using a first convolutional neural network (CNN) to produce a satellite vector that identifies at least one fire;
automatically directing a mobile sensor to a mobile location based on the satellite vector;
obtaining a fine-grained mobile image from the mobile sensor;
processing the fine-grained mobile image using a second convolutional neural network (CNN) to produce a mobile vector that identifies one or more of the at least one fire;
confirming a location of the at least one fire based on the satellite vector and the mobile vector; and
configuring the mobile sensor to navigate based on both the satellite vector and the mobile vector using a first reinforcement learning system.

15. The apparatus of claim 14, wherein the mobile sensor comprises an aerial drone.

16. The apparatus of claim 15, wherein an action space is a defined set of allowable actions and a space state is a current environment encountered by the first reinforcement learning system, the space state defined in terms of one or more of sensor orientation, aperture control, field of vision control, and spectral control.

17. The apparatus of claim 15, wherein a reward and a next state of the first reinforcement learning system is generated in response to a selected action and a current state of the first reinforcement learning system, and wherein the reward is an indication of a success or a failure of a sequence of selected actions in advancing toward a defined goal.

18. The apparatus of claim 15, wherein a second reinforcement learning system is implemented to control a remote satellite, wherein a state space and an action space of the second reinforcement learning system is specific to satellite control, and the second reinforcement learning system initially uses a mobile vector for learning and then utilizes both the mobile vector and the satellite vector for the learning.

* * * * *